(12) United States Patent
Nakil et al.

(10) Patent No.: US 7,333,429 B1
(45) Date of Patent: Feb. 19, 2008

(54) METHOD AND APPARATUS FOR OVERSUBSCRIPTION OF PERMANENT VIRTUAL CIRCUITS

(75) Inventors: Harshad B. Nakil, San Jose, CA (US); Prasad Miriyala, Mountainview, CA (US)

(73) Assignee: Cisco Technology, Inc., San Jose, CA (US)

( * ) Notice: Subject to any disclaimer, the term of this patent is extended or adjusted under 35 U.S.C. 154(b) by 861 days.

(21) Appl. No.: 10/703,869

(22) Filed: Nov. 6, 2003

Related U.S. Application Data

(62) Division of application No. 09/593,273, filed on Jun. 13, 2000, now Pat. No. 6,760,334.

(51) Int. Cl.
*H04L 1/00* (2006.01)

(52) U.S. Cl. .................. 370/229; 370/230.1; 370/395.4
(58) Field of Classification Search ............. 370/395.4, 370/229, 418, 395.2, 230.1
See application file for complete search history.

(56) References Cited

U.S. PATENT DOCUMENTS

| 5,706,288 | A * | 1/1998 | Radhakrishnan et al. ... 370/418 |
| 6,049,526 | A * | 4/2000 | Radhakrishnan et al. ... 370/229 |
| 6,760,334 | B1 * | 7/2004 | Nakil et al. .............. 370/395.2 |
| 6,810,012 | B1 * | 10/2004 | Yin et al. ................. 370/230.1 |
| 6,922,409 | B1 * | 7/2005 | Medhat et al. ........... 370/395.2 |
| 2002/0181397 | A1 * | 12/2002 | Licht .......................... 370/230 |
| 2005/0018601 | A1 * | 1/2005 | Kalkunte et al. ........... 370/229 |

* cited by examiner

*Primary Examiner*—Chi Pham
*Assistant Examiner*—Albert T. Chou
(74) *Attorney, Agent, or Firm*—Marger Johnson & McCollom, P.C.

(57) ABSTRACT

The method establishes a number of permanent virtual circuits to be configured on a multiservice access device. At least one of the permanent virtual circuits is configured as an oversubscription (OS PVC). The OS PVC may be configured as a normal PVC with additional parameters. The additional parameters, such as a timer, allow the PVC to assume either an active state or an oversubscription state. It is put into the oversubscription state if the timer expires and there is no traffic during the timer interval. Once in the oversubscription state, the PVC can be activated upon the presence of traffic. The OS PVC may be configured by placing it into a service queue when it has cells to send. The service queue is processed in sequential order until it is empty.

15 Claims, 4 Drawing Sheets

METHOD AND APPARATUS FOR OVERSUBSCRIPTION OF PERMANENT VIRTUAL CIRCUITS

This application is a divisional of prior application Ser. No. 09/593,273 filed Jun. 13, 2000 now U.S. Pat. No. 6,760,334.

BACKGROUND

1. Field

This invention relates to configuration of multiservice access devices, more particularly to methods of configuring them to handle oversubscription and a multiservice access device capable of being oversubscribed.

2. Background

Multiservice access devices allow networks to handle all types of traffic such as voice, data and video. These devices are normally configured with a set number of permanent virtual circuits (PVCs) and switched virtual circuits (SVCs). Examples of this device include multiservice access switches and multiservice access concentrators.

PVCs are point-to-point configurations between devices connected by a network. They are configured before any traffic is sent, and once configured they remain in place. SVCs only exist as long as the two devices communicate, and are established at the time the transmission is required. As soon as transmission between the devices stops, the circuit is disbanded.

The disadvantage of PVCs lies in the configuration parameters of the connections. Since the circuits are established ahead of time, they typically are configured with a type of service. The type of service specifies the nature of the transmission rate for the PVC. The services include constant bit rate, variable bit rate-real time, variable bit rate-non-real time, and unspecified bit rate. The first three have guaranteed throughputs, and constant bit rate service has a constant throughput as well. PVCs connected with unspecified bit rates do not have guaranteed throughputs.

Multiservice access devices that utilize PVCs for handling traffic typically handle oversubscription on the device by converting oversubscribed PVCs to unspecified bit rate service. Therefore, a method and apparatus is needed that will allow oversubscription in a more efficient manner and increase the usefulness of the device.

SUMMARY

One aspect of the invention is a method for configuring permanent virtual circuits in a multiservice access device. At least one of the permanent virtual circuits is configured as an oversubscription permanent virtual circuit (OS PVC). The configuration may involve configuring the OS PVC as a normal PVC with an added parameter of a timer. If the PVC is active, it can move into the OS state upon an absence of traffic for a time interval determined by a timer. Once it is in the OS state, traffic is monitored. If necessary the PVC is moved back to the active state to handle traffic. In one example, an OS designator is used to identify PVCs in the OS state, configured as unspecified bit rate PVCs. When the PVC becomes active, it is attempted to be configured as a normal PVC. If the bandwidth is not available, it returns to the unspecified bit rate configuration.

Another aspect of the invention involves modifying the traffic shaping process. This is done my having multiple entries competing for the same cell transmit opportunity in the calendar table. Also, the introduction of a service queue will handle the multiple entries in the traffic shaping table (calendar). The service queue is serviced in a first in first out manner.

Another aspect of the invention involves configuring some of the PVCs as OS PVCs by adding them to a service queue, as necessary. The PVCs in the service queue are defined as being oversubscription PVCs. The service queue is handled in a sequential fashion until empty.

Another aspect of the invention is a multiservice access device that can be configured for oversubscription.

BRIEF DESCRIPTION OF THE DRAWINGS

The invention may be best understood by reading the detailed description with reference to the drawing(s), wherein.

DETAILED DESCRIPTION OF THE EMBODIMENTS

Figure 1:
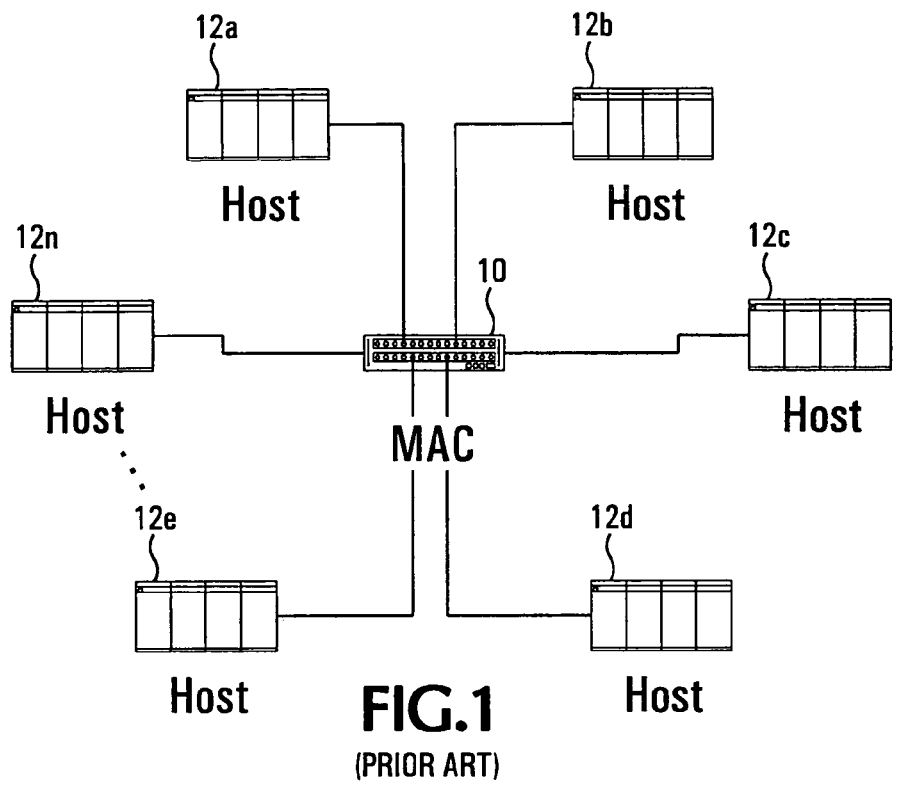
FIG. 1 shows a network utilizing a prior art multiservice access device.

FIG. 1 shows a network connection using a multiservice access device. In this example the device is a multiservice access concentrator (MAC) 10. Multiservice access devices allow networks to transfer multiple types of traffic, including voice, data and video. Each of the hosts 12a . . . 12n make connections to each other through the concentrator 10. The permanent virtual circuits are established between these hosts to allow traffic flow from one point to another. As discussed above, the concentrator 10 is limited by its ability to handle oversubscription, or overbooking, on these PVCs. Overbooked PVCs are converted to unspecified bit rate (UBR).

Figure 2:
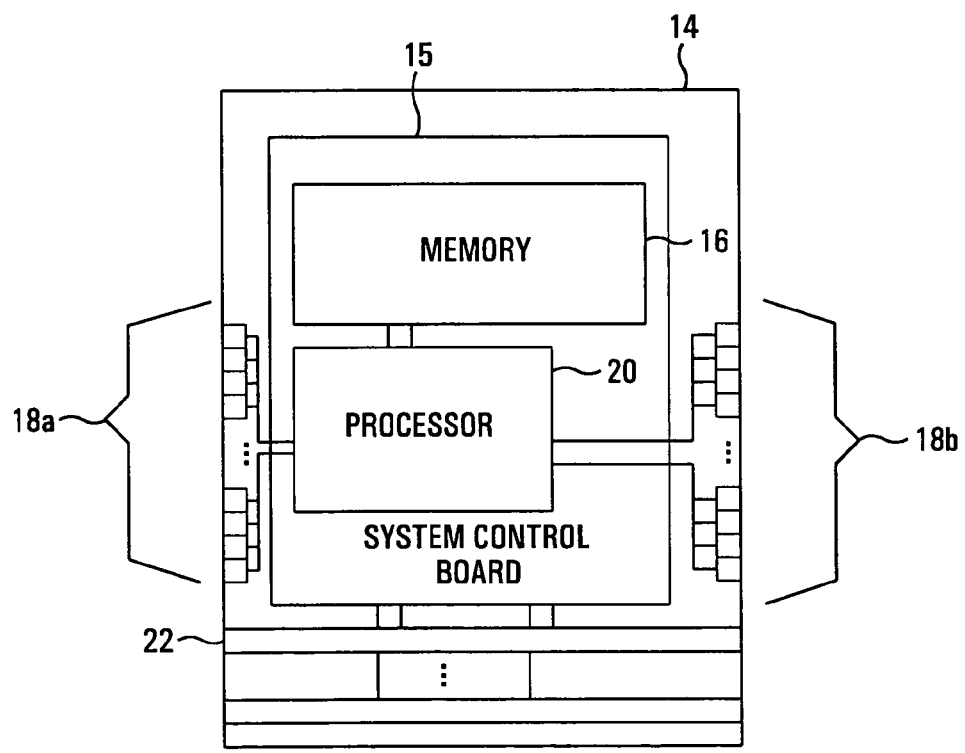
FIG. 2 shows one embodiment of a multiservice access device configurable for oversubscription, in accordance with the invention.

In general, this problem can be overcome by developing a method to handle oversubscription. However, in order to apply any method of oversubscription of PVCs, a device must have the configurability to handle oversubscribing. A multiservice access device 14 with such a capability is shown in FIG. 2. The device 14 includes a processor 20 and a memory 16, typically located on a system control board 15, also known as a motherboard. The device will have at least one set of physical ports 18a, as well as additional physical ports 18b. These ports allow the multiservice device 14 to communicate with several different devices on the network.

The processor 20 configures the physical ports to provide the PVCs between different devices on the network, including those not directly connected to the multiservice device 14. The various characteristics of these PVCs and the physical ports are normally maintained in various tables stored in the memory 16. Expansion slots, such as that shown by 22, may add physical ports as well as other capabilities. For example, a particular configuration of a device may only offer analog voice ports and interfaces. An additional card could be inserted into the expansion slot 22 allowing the further capability of digital voice.

The capability of handling oversubscription in a method other than rendering all oversubscribed PVCs as unspecified bit rate (UBR) PVCs will typically be added to the multi-service device 14 via software. The functionality of the software will be described in more detail further. However, the method of providing this capability will typically involve some sort of computer-readable medium that contains the software. The software could be loaded into the multiservice device via a personal computer connected directly to one of the ports. Alternatively, some multiservice devices allow configuration to be managed via an Ethernet™ or other type of port to a local-area network (LAN). Regardless of the particular method of adding the software, it will be distributed to the multiservice device via some sort of computer-readable medium, such as a file transferred from a PC or a downloaded file sent across a network.

Figure 3:
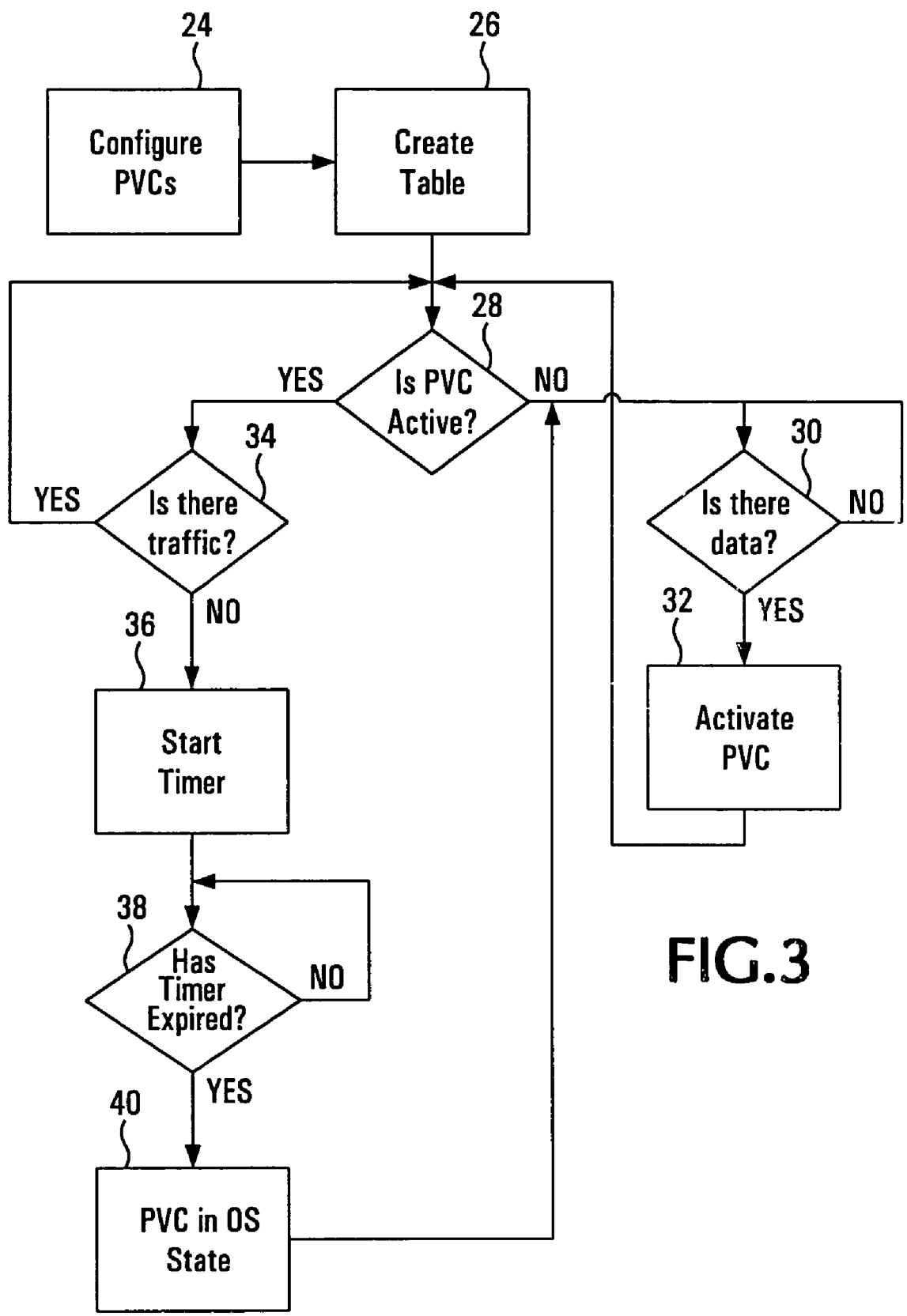
FIG. 3 shows a flowchart of one embodiment of a method for configuring a multiservice access device with oversubscription permanent virtual circuits in accordance with the invention.

Several methods of configuring the PVCs as oversubscription PVCs are possible. One embodiment of such a method is shown in FIG. 3, with no intention of limiting the scope of the invention. At 24, the PVCs are configured, including at least one configured as an oversubscription PVC.

In this particular example of configuration, the PVCs with oversubscription do not have entries in the traffic shaping table used by the traffic manager for the network traffic. Instead another table is created at 26. This oversubscription (OS) table contains the PVC identifier and its associated parameters, including traffic shaping. This table will be used to create entries for the traffic shaping table as needed, as will be discussed further. It may be used with another table that gives a timer value for each PVC. Examples of OS and timing table headers are shown below.

| PVC # | Vpi/vci | PCR | MBS | SCR |
|---|---|---|---|---|

Oversubscription Table.

| PVC # | Timer value |
|---|---|

Timing Table

These tables are lists of these values that allow the processor to identify the necessary parameters needed for the traffic shaping table. The vpi/vci term is specific to Asynchronous Transfer Mode (ATM) networks. The virtual path identifier/virtual channel identifier in an ATM network identifies the next destination for the ATM cell. In a frame relay network, this parameter would be the data connection link identifier (DLCI). The terms PCR, MBS and SCR are peak cell rate; maximum burst size; and sustain cell rate, respectively. They identify the amounts and rate of data a given PVC can handle. Again, these particular parameters are specific to an ATM network, but have analogous counterparts in other networks, such as frame relay.

These oversubscription PVCs have two states, active and oversubscription (OS). Essentially, they are configured similarly to 'normal' PVCs, but have additional parameters. The example shown in FIG. 3 determines if the PVC is active at 28. If the PVC is not active, it is therefore in the OS state by elimination. It remains in the OS state until traffic is present for that PVC at 30. Once traffic is detected for that PVC, the PVC is activated at 32 and the process returns to monitoring the active status at 28.

In this manner, the oversubscription PVCs can be called up from the OS list as reserves for use when necessary. As will be seen further, the PVCs will be of service types other than unspecified bit rate. Therefore if the bandwidth is not available for the PVCs to be activated as constant bit rate, or either of the variable bit rate types, the PVCs remain as unspecified bit rate and the traffic packets for those PVCs are discarded. This will be discussed in more detail with reference to FIG. 4.

The list of reserve PVCs is populated from those PVCs configured as oversubscription, or OS, PVCs. Referring now to the decision at 28 as to the activity of the PVC, the process for an active PVC will be discussed. If the PVC has been configured with the additional parameters to designate it as an OS PVC and it is active, the traffic on the PVC is monitored at 34. If there is no traffic, a timer is activated at 36 with the value from the timing table shown above. Once the timer is determined to have expired at 38, the PVC is moved to the OS state at 40. The timer may be active on all OS PVCs regardless of the presence of traffic. Essentially, if there is no traffic for a time interval determined by the timer, the PVC is moved to the OS state and the process moves to monitoring it for activity.

As mentioned above, only active PVCs have entries in the traffic shaping table. PVCs in the OS state have entries in the OS table. When the PVC becomes active at 32, the entry in the OS table of that PVCs traffic shaping parameters is moved to the traffic shaping table. This is merely one example of a method of configuring at least one of the PVCs on a multiservice access device as an oversubscription PVC, and is not intended to limit the invention in scope.

Figure 4:
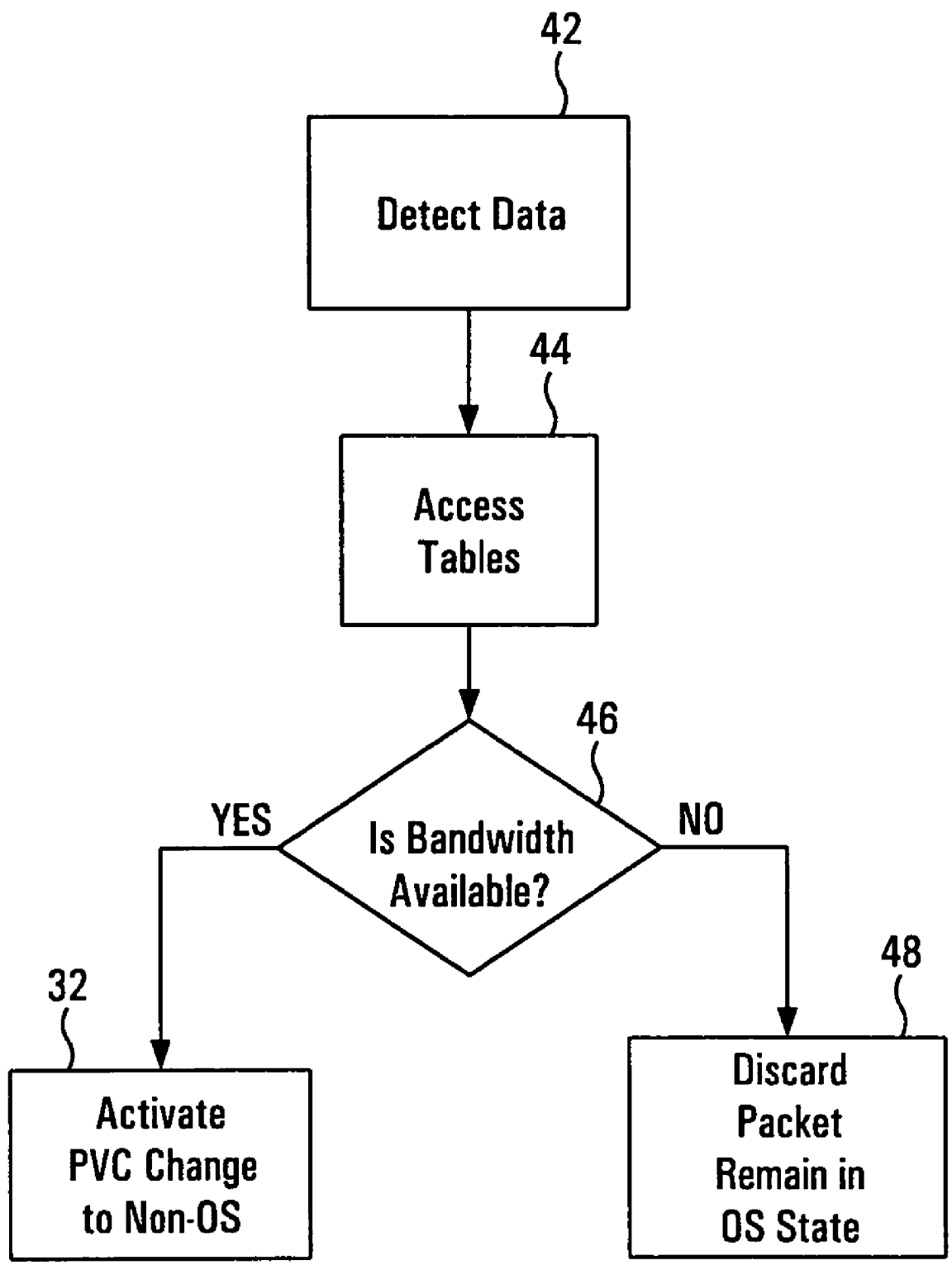
FIG. 4 shows a flowchart of one embodiment of activating a permanent virtual circuit from an oversubscribed state, in accordance with the invention.

An addition to this method would be to set a designator or 'flag' that indicates it is a PVC in the OS state. Referring now to FIG. 4, traffic is detected in either direction at 42, and an attempt to activate the PVC is made. The OS table is accessed to determine the necessary parameters for that PVC. At 46, a determination if the necessary bandwidth is available for the parameters set out in the OS table. If the bandwidth is available, the process activates the PVC at 32, the same activation as in FIG. 3. In addition to activating the PVC, the OS flag is set as false, making the PVC a non-oversubscription PVC. If the bandwidth necessary for that PVC is not available, the packet is discarded at 48 and the OS flag remains true.

An example of a table or list header including such a flag is shown below. This particular table is for a frame relay network and uses a DLCI instead of the vpi/vci parameter.

| PVC # | DLCI | Peak Rate | Sustained Rate | MBS | OS Flag | Timer Value |
|---|---|---|---|---|---|---|

Oversubscription Table with OS Flag

The above example and the addition to the example do not affect parameters in the traffic shaping table for PVCs. As mentioned above, the traffic shaping parameters for the OS PVCs are only added to the traffic shaping table when the PVC becomes active. Some examples of methods for handling overbooking may alter the parameters in the traffic shaping table.

Figure 5:
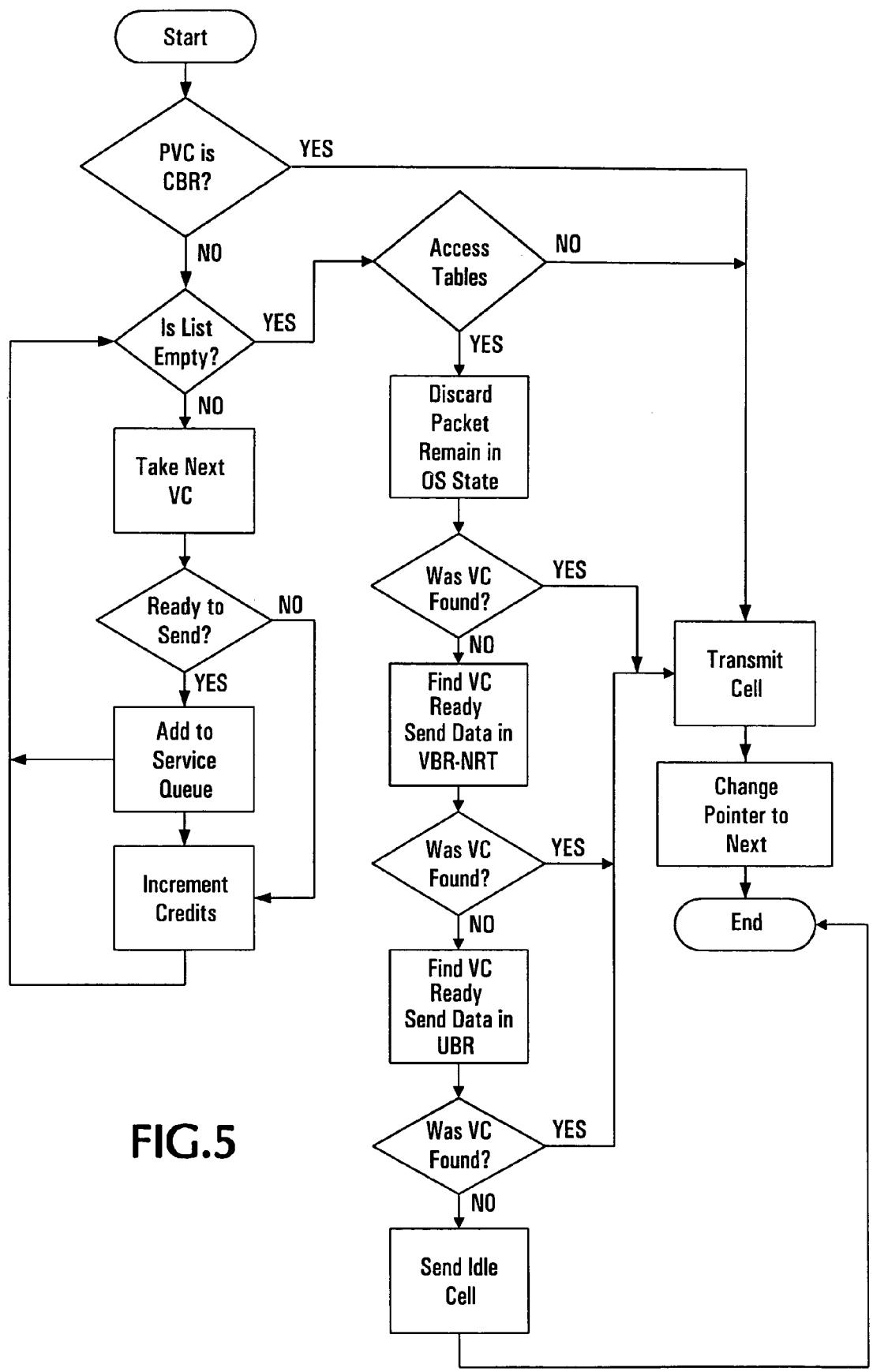
FIG. 5 shows a flowchart of one embodiment of a method for configuring a multiservice access device with an oversubscription service queue in accordance with the invention.

An example of such a method is shown in FIG. 5. It is helpful to discuss some of the techniques used to set up and populate scheduling and traffic shaping tables. For example, in Asynchronous Transfer Mode (ATM) networks, calendar scheduling algorithms have a table which represent the calendar. Each entry in the table represents a scheduling opportunity or a cell transmit slot in the ATM. A scheduling opportunity is an opportunity to send cells.

The size of the table depends upon the smallest rate supported, and the rate of scanning the table represents the highest rate supported. The table size is equal to the maximum rate needed divided by the minimum rate needed. The scan rate is the inverse of the maximum rate needed. For example, there are 1000 entries in the table and the scan rate is one slot every one millisecond. If a connection is scheduled in every slot of the table, the maximum rate is 1000 cells per second. If the connection only has one entry in the table, the minimum rate is 1 cell per second. This table is used to control the sustained cell rate of the connection. The table is populated in the table such that the rate for that connection is equal to the sustained cell rate.

In an inefficient network, the sum of the sustained cell rates (SCRs) for all of the PVCs is less than or equal to the interface capability. The network cannot assure more bandwidth than the link speed. However, in practice the network manager may know about traffic patterns, times and bursts. It would seem that an efficient network would want to capitalize on this knowledge. One method of doing so would be to allow oversubscription of PVCs. However, current multiservice devices do not support this.

This can be seen by an analysis of a pseudo-code representation of the current calendar scheduling technique. There are four classes of service: 1. VBR-RT (variable bit rate-real time); 2. VBR-NRT (variable bit rate-not real time); 3. UBR (unspecified bit rate); 4. CBR (constant bit rate). When a connection is added the scheduling table is populated with connection ID with SCR rate. Each table entry can hold only one entry.

The variables used below are defined as:
connection minimum cell delay CON_MIN_CELL_DELAY[VC]=1/(PCR)
maximum credits CON_MAX_CREDITS[VC]=MBS
connection currents credits CON_CURR_CREDITS[VC]=MBS.

The maximum credits are constant for every connection. The current credits for a give connection may vary according the process set out in pseudo code below. The current table pointer which pointed current cell slot in the table

```
send_cell( ) INVOKED for every cell time
  VC= get vc from current table SLOT
  If VC class is CBR
  then
    transmit cell for this VC
    make the current pointer point to next slot in the table
    exit send_cell
  Else
    VC CLASS is other then CBR
    if CON_CURR_CREDITS[VC] < COM_MAX_CREDITS[VC]
    THEN
      INCREMENT CON_CURR_CREDITS[VC]
    ENDIF
  ENDIF
  FOR ALL VC IN VBR-RT LIST
    IF CON_CURR_CREDITS[VC] >0
      AND VC has data to send
      AND TIME elapsed from last cell transmit >
      CON_MIN_ CELL_DELAY[VC]
    then
      transmit cell for this VC
      decrement CON_CURR_CREDITS[VC]
```

```
      get time stamp
      make the current pointer point to next slot in the table
      exit send_cell
    ENDIF
  FOR ALL VC IN VBR-NRT LIST
    IF CON_CURR_CREDITS[VC] >0
      AND VC has data to send
      AND TIME elapsed from last cell transmit >
      CON MIN_ CELL_DELAY[VC]
    then
      transmit cell for this VC
      decrement CON_CURR_CREDITS[VC]
      get time stamp
      make the current pointer point to next slot in the table
      exit send_cell
    ENDIF
  FOR ALL VC IN UBR LIST
    IF CON_CURR_CREDITS[VC] >0
      AND VC has data to send
      AND TIME elapsed from last cell transmit >
      CON_MIN_ CELL_DELAY[VC]
    then
      transmit cell for this VC
      get time stamp
      make the current pointer point to next slot in the table
      exit send_cell
    ENDIF
  make the current pointer point to next slot in the table
END send_cell
```

However, the above method has two main drawbacks. First, oversubscription SCR is not supported in the above scheme because only one PVC can be present in one table entry. Therefore, no sustained cell rate can be guaranteed for any oversubscribed PVCs. The second drawback is that infinite MBS also cannot be supported in above scheme.

Infinite MBS means that credits are always available. In some cases, the peak rate of connection can be defined as the link rate. For example, assume that PVCs with a higher class of service such as VB-RT has infinite MBS and the peak rate for these connections equals the line rate. These connections will always be ready to send data. This PVC will then not allow any connections with lower classes of service such as VB-NRT and UBR to transmit and these connections will starve.

However, by modifying the process for calendar scheduling techniques, these drawbacks may be overcome. Each entry for the table now is pointer to a list of PVCs. An entry into the table can either be a CBR PVC or a list of other PVCs. This method introduces a queue called SERVICE_QUEUE. This is a queue of PVCs ready to transmit cells.

When connection is added the scheduling table is populated with connection ID with SCR rate, and each table entry can hold one CBR entry or LIST of other VCs.
connection minimum cell delay CON_MIN_CELL_DELAY[VC]=1/(PCR)
maximum credits COM_MAX_CREDITS[VC]=MBS
connection currents credits CON_CURR_CREDITS[VC]=MBS
The current table pointer is pointed to the current cell slot in the table

```
send_cell( ) INVOKED for every cell time
  If current entry has CBR entry
  then
    VC = get VC from the current entry
    transmit cell for this VC
    make the current pointer point to next slot in the table
```

```
      exit send_cell
   Else
      FOR ALL VC IN THE LIST in current slot
         IF VC has data to send
         AND TIME elapsed from last cell transmit >
CON_MIN_CELL_DELAY[VC]
            THEN
               IF QUEUE NOT FULL
               THEN
                  ADD THE VC TO SERVICE QUEUE
                  CONTINUE WITH NEXT VC
               ENDIF
            ENDIF
            IF CON_CURR_CREDITS[VC] < COM_MAX_CREDITS[VC]
            THEN
               INCREMENT CON_CURR_CREDITS[VC]
            ENDIF
      ENDIF
      IF SERVICE QUEUE NOT EMPTY
      THEN
         VC = get VC from the SERVICE QUEUE
         transmit cell for this VC
         make the current pointer point to next slot in the table
         exit send cell
      ENDIF
      FOR ALL VC IN VBR-RT LIST
         IF CON_CURR_CREDITS[VC] >0
         AND VC has data to send
         AND TIME elapsed from last cell transmit >
CON_MIN_CELL_DELAY[VC]
         then
            transmit cell for this VC
            decrement CON_CURR_CREDITS[VC]
            get time stamp
            make the current pointer point to next slot in the table
            exit send_cell
         ENDIF
      FOR ALL VC IN VBR-NRT LIST
         IF CON_CURR_CREDITS[VC] >0
         AND VC has data to send
         AND TIME elapsed from last cell transmit >
CON_MIN_CELL_DELAY[VC]
         then
            transmit cell for this VC
            decrement CON_CURR_CREDITS[VC]
            get time stamp
            make the current pointer point to next slot in the table
            exit send_cell
         ENDIF
      FOR ALL VC IN UBR LIST
         IF CON_CURR_CREDITS[VC] >0
         AND VC has data to send
         AND TIME elapsed from last cell transmit >
CON_MIN_CELL_DELAY[VC]
         then
            transmit cell for this VC
            get time stamp
            make the current pointer point to next slot in the table
            exit send_cell
         ENDIF
      make the current pointer point to next slot in the table
   END send_cell
```

In this example, modifications can be made to introduce a new type of table entry to configure for oversubscription PVCs. Instead of there being one PVC per table entry, a table entry can now also be a list of the other PVC. In addition to this modification, a service queue is introduced. The service queue contains lists of PVCs that are ready to transmit ATM cells. The scheduling table discussed above is populated with connection Ids and the sustained cell rate. The table entry can hold one constant bit rate PVC or a list of other PVCs.

Essentially this method examines the current slot in the table. If the current slot has a CBR connection, the cell is transmitted and the index moves to the next slot in the table. If the table has any other type of connection, and this connection is ready to send a cell, it is put into the service queue. If it is not ready to transmit, the maximum connection credits is incremented up to the maximum credits. If the service queue has any PVCs in it, it takes each PVC and transmits the cell for that PVC and removes it from the service queue. This example of a modified process is shown in flowchart form in FIG. 5.

In the previous method the PVCs that had data to send were only given an increment in their credits. In the modified method, PVCs added to the service queue are actually being scheduled to transmit. Furthermore, when oversubscription occurs, the PVCs are still allocated bandwidth. The bandwidth allocated is less than the sustained cell rate for that PVCs, but is allocated proportional to the SCR.

As mentioned above, this example involves changing the traffic shaping algorithm to handle the multiple table entries and the service queue. The first example did not involve that change, but merely added the traffic shaping entries as needed. In either example, the method of handling overbooking on the multiservice access device involves configuring at least one PVC as an oversubscription PVC. The configuration could include configuring a normal PVC with an additional parameter of a timer, or adding the capability of the PVCs to be put into a service queue for processing. In the latter example, the service queue would be considered one of the configuration tables maintained in the memory 16 of multiservice device 14 of FIG. 2. The configuration tables would now include oversubscription configuration tables, either the oversubscription and timing tables or the service queue.

Thus, although there has been described to this point a particular embodiment for a method and structure for handling oversubscription on a multiservice access device, it is not intended that such specific references be considered as limitations upon the scope of this invention except in-so-far as set forth in the following claims.

What is claimed is:

1. A method of configuring a multiservice access device, the method comprising:
   populating a scheduling table with entries, wherein the entries include lists of multiple virtual circuits;
   establishing a service queue, wherein each virtual circuit in the list is added to the service queue if the virtual circuit has data to send and is not a constant bit rate virtual circuit; and
   allocating bandwidth to each virtual circuit in an oversubscription environment such that the bandwidth is less than a sustained cell rate for that virtual circuit but is allocated proportional to the sustained cell rate.

2. The method of claim 1, further comprising scheduling each virtual circuit added to the service queue to transmit data.

3. The method of claim 1, wherein the scheduling table further comprises a calendar scheduling table.

4. The method of claim 3, wherein the scheduling table controls the sustained cell rate of a virtual circuit.

5. The method of claim 1, wherein the service queue further comprises a configuration table.

6. A network device, comprising:
   a memory;
   a processor to:
      populate a scheduling table with entries, wherein the entries include lists of multiple virtual circuits;
      establish a service queue in the memory, wherein each virtual circuit in the list is added to the service queue if the virtual circuit has data to send and is not a constant bit rate virtual circuit; and allocate bandwidth to each virtual circuit in an oversubscription environment such that the bandwidth is less than a sustained cell rate for that virtual circuit but is allocated proportional to the sustained cell rate.

7. The device of claim 6, the processor further to schedule each virtual circuit added to the service queue to transmit data.

8. The device of claim 6, wherein the scheduling table further comprises a calendar scheduling table.

9. The device of claim 8, wherein the scheduling table controls the sustained cell rate of a virtual circuit.

10. The device of claim 6, wherein the service queue further comprises a configuration table for the network device.

11. A network device, comprising:
a means for storing information;
a means for populating a scheduling table with entries, wherein the entries include lists of multiple virtual circuits;
a means for establishing a service queue in the memory, wherein each virtual circuit in the list is added to the service queue if the virtual circuit has data to send and is not a constant bit rate virtual circuit; and
a means for allocating bandwidth to each virtual circuit in an oversubscription environment such that the bandwidth is less than a sustained cell rate for that virtual circuit but is allocated proportional to the sustained cell rate.

12. The device of claim 11, further comprising means for scheduling each virtual circuit added to the service queue to transmit data.

13. The device of claim 11, wherein the scheduling table further comprises a calendar scheduling table.

14. The device of claim 13, wherein the scheduling table controls the sustained cell rate of a virtual circuit.

15. The device of claim 11, wherein the service queue further comprises a configuration table for the network device.

* * * * *